(12) United States Patent
Velev et al.

(10) Patent No.: US 12,028,912 B2
(45) Date of Patent: *Jul. 2, 2024

(54) METHOD FOR (RE)SELECTION OF CONTROL PLANE AND USER PLANE DATA TRANSMISSION

(71) Applicant: NEC Corporation, Tokyo (JP)

(72) Inventors: Genadi Velev, Heidelberg (DE); Iskren Ianev, Heidelberg (DE); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 427 days.

This patent is subject to a terminal disclaimer.

(21) Appl. No.: 17/154,790

(22) Filed: Jan. 21, 2021

(65) Prior Publication Data

US 2022/0117016 A1 Apr. 14, 2022
US 2023/0093775 A9 Mar. 23, 2023

Related U.S. Application Data

(63) Continuation of application No. 16/810,384, filed on Mar. 5, 2020, now Pat. No. 10,945,300, which is a
(Continued)

(30) Foreign Application Priority Data

Feb. 17, 2016 (EP) .................................... 16275027

(51) Int. Cl.
*H04W 76/12* (2018.01)
*H04L 67/12* (2022.01)
(Continued)

(52) U.S. Cl.
CPC ............. *H04W 76/12* (2018.02); *H04L 67/12* (2013.01); *H04W 24/08* (2013.01); *H04W 4/70* (2018.02); *H04W 88/02* (2013.01); *H04W 88/16* (2013.01)

(58) Field of Classification Search
CPC ..... H04W 76/12; H04W 24/08; H04W 88/16; H04W 4/70; H04W 88/02; H04L 67/12
See application file for complete search history.

(56) References Cited

U.S. PATENT DOCUMENTS 10,616,936 B2 * 4/2020 Velev .................... H04W 24/08
10,945,300 B2 * 3/2021 Velev .................... H04W 24/08
(Continued)

FOREIGN PATENT DOCUMENTS

EP 2509386 A1 * 10/2012 ........ H04W 36/0055
JP 2014-510496 A 4/2014
(Continued)

OTHER PUBLICATIONS

Japanese Office Action for JP Application No. 2020-068294 mailed on May 18, 2021 with English Translation.
(Continued)

*Primary Examiner* — Jael M Ulysse

(57) ABSTRACT

The invention describes a method for dynamic switching between a control plane data transmission and user plane data transmission avoiding the Detach and consecutive re-attach procedure or TAU procedure. In particular the decision for switch between the different transmission schemes is based on various criteria like the size of the data packet or on total amount of data, etc.

2 Claims, 10 Drawing Sheets

Example of single node non-roaming CIoT architecture

Related U.S. Application Data continuation of application No. 15/755,927, filed as application No. PCT/JP2017/004181 on Feb. 6, 2017, now Pat. No. 10,616,936.

(51) Int. Cl.
*H04W 24/08* (2009.01)
*H04W 4/70* (2018.01)
*H04W 88/02* (2009.01)
*H04W 88/16* (2009.01)

(56) References Cited

U.S. PATENT DOCUMENTS

| | | | |
|---|---|---|---|
| 2014/0226606 A1 | 8/2014 | Nishigori et al. | |
| 2014/0242962 A1 | 8/2014 | Choi et al. | |
| 2015/0189689 A1* | 7/2015 | Wang | H04W 4/70 370/329 |
| 2016/0157251 A1* | 6/2016 | Schliwa-Bertling | H04W 4/70 370/315 |
| 2017/0041752 A1* | 2/2017 | Baek | H04W 76/40 |
| 2017/0150332 A1 | 5/2017 | Palanisamy et al. | |
| 2018/0062800 A1* | 3/2018 | Chandramouli | H04W 76/11 |
| 2018/0184246 A1* | 6/2018 | Ryu | H04W 68/06 |
| 2018/0192394 A1 | 7/2018 | Jin et al. | |
| 2018/0220289 A1* | 8/2018 | Ryu | H04W 8/08 |
| 2018/0295556 A1* | 10/2018 | Baek | H04W 8/26 |
| 2018/0324652 A1* | 11/2018 | Ryu | H04W 8/04 |
| 2018/0332462 A1* | 11/2018 | Kim | H04W 28/02 |
| 2018/0352416 A1* | 12/2018 | Ryu | H04W 4/08 |
| 2018/0376531 A1* | 12/2018 | Martinez Tarradell | H04W 36/0022 |
| 2019/0021023 A1* | 1/2019 | Byun | H04W 4/70 |
| 2019/0021069 A1* | 1/2019 | Chun | H04W 76/10 |
| 2019/0021130 A1* | 1/2019 | Kim | H04W 72/23 |
| 2019/0028337 A1* | 1/2019 | Ryu | H04W 8/02 |
| 2019/0028925 A1 | 1/2019 | Chun et al. | |
| 2019/0037377 A1* | 1/2019 | Ke | H04W 8/18 |
| 2020/0267800 A1* | 8/2020 | Kim | H04W 76/38 |

FOREIGN PATENT DOCUMENTS

| | | |
|---|---|---|
| WO | 2013/047200 A1 | 4/2013 |
| WO | WO 2014/041805 A1 | 3/2014 |
| WO | 2016/004301 A1 | 1/2016 |

OTHER PUBLICATIONS

JP Office Action for JP Application No. 2021-171577, mailed on Sep. 6, 2022 with English Translation.
China Unicom, "Discussion on RAN-side optimization of differentiation of CP/UP solution", 3GPP TSG-RAN WG3#91 R3-160400, 3GPP, Feb. 6, 2016, pp. 1-3.
International Search Report mailed May 4, 2017, in corresponding PCT International Application.
"3$^{rd}$ Generation Partnership Project; Technical Specification Group Services and System Aspects; Architecture Enhancements for Cellular Internet of Things, (Release 13)", 3GPP TR 23.720, V1.2.0, pp. 1 96, (2015).
"3$^{rd}$ Generation Partnership Project; Technical Specification Group Services and System Aspects; General Packet Radio Service (GPRS); Enhancements for Evolved Universal Terrestrial Radio Access Network, (E UTRAN) Access, (Release 13)", 3GPP TS 23.401, V13.5.0, pp. 1-337, (2015).
"3$^{rd}$ Generation Partnership Project; Technical Specification Group Services and System Aspects; General Packet Radio Service (GPRS); Enhancements for Evolved Universal Terrestrial Radio Access Network, (E-UTRAN) Access, (Release 13)", Interim Draft 3GPP TS 23.401, V13.5.0, pp. 1-361, (2016).
"3$^{rd}$ Generation Partnership Project; Technical Specification Group Services and System Aspects; Architecture Enhancements to Facilitate Communications with Packet Data Networks and Applications, (Release 13)", 3GPP TS 23.682, V13.4.0, pp. 1-81, (2015).
3GPP TSG SA WG2 Meeting #113, S2-160832, 14 sheets (2016).
"3$^{rd}$ Generation Partnership Project; Technical Specification Group Services and System Aspects; Policy and Chargin Control Architecture, (Release 13)", 3GPP TS 23.203, V13.5.1, pp. 1-243, (2015).
Japanese Office Action of the counterpart Japanese Patent Application No. 2018-543258 issued on Aug. 20, 2019.
Huawei, Hisilicon; "Direct User Plane Path Establishment for SIPTO at Local Network on eNode[online]", 3GPP TSG-SA WG2#96, S2-131518, Internet URL:http://www.3gpp.org/ftp/tsg_sa/WG2_Arch/TSGS2_96_San_Diego/Docs/S2-131518.zip, pp. 2-5 (Apr. 2013).
Samsung; "The User Plane CIOT Optimization[online]", 3GPP TSG RAN WG3 adhoc_R3_AHG_NB-IOT R3-160124, Internet <URL:http://www.3gpp.org/ftp/tsg_ran/WG3_1u/TSGR3_AHGs/R3_AHG_NB-IOT/Docs/R3-160124.zip>, pp. 2-9 (Jan. 2016).
NEC; Establishment Cause Value in Solution 2 and 1B[online], 3GPP TSG RAN WG2_adhoc_2016_01_LTE_NB_IoT R2-160511, InternetURL:http://www.3gpp.org/ftp/tsg_ran/WG2_RL2/TSGR2_AHs/2016_01_LTE_NB_LoT/Docs/R2-160511.zip, p. 2-5 (Jan. 2016).
Ericsson, Alcatel Lucent; User Plane Based Solution with Information Stored in RAN[online], 3GPP TSG-SA WG2#111 S2-153694, Internet URL:http://www.3gpp.org/ftp/tsg_sa/WG2_Arch/TSGS2_111 Chengdu/Docs/S2-153694.zip. pp. 2-10 (Oct. 2015).
Huawei, "Resume Function in User Plane solution", Jan. 20-22, 2016, 3GPP TSG RAN WG3 AdHoc NB-IoT, R3-160048, pp. 1-3 (Year: 2016).
Huawei et al., "NNSF and CIoT optimization solution selection", Jan. 20-22, 2016, 3GPP TSG RAN WG3 AdHoc NB-IoT, R3-160049, pp. 1 and 2 (Year: 2016).
Alcatel-Lucent et al., "Paging strategies for cI OT User Plane Optimization", Jan. 20-22, 2016, 3GPP TSG-RAN WG3 # Adhoc NB-IOT, R3-160107, pp. 1-4 (Year: 2016).
U.S. Office Action for U.S. Appl. No. 16/810,384 mailed on Sep. 16, 2020.
JP Office Action for JP Application No. 2022-199482, mailed on Sep. 26, 2023 with English Translation.
Orange, "Solution 2 update / MO and MT procedures", 3GPP TSG-SA WG#112 S2-153792, 3GPP, 2015, Nov. 12, 2015, pp. 1-pp. 5., California, USA.
Ericsson, "PDN connection activation for CIoT", 3GPP TSG-SA WG2#112 S2-153870, 3GPP, 2015, Nov. 12, 2015, pp. 1-pp. 10., Anaheim, USA.
JP Office Action for JP Application No. 2022-199482, mailed on Dec. 5, 2023 with English Translation.
Alcatel-Lucent, Alcatel-Lucent Shanghai Bell, Verizon, EPS Attach for CIoT EPS optimization, 3GPP TSG-CT WG1#95bis C1-160103, 3GPP, Jan. 6, 2016.

* cited by examiner

[Fig. 4]
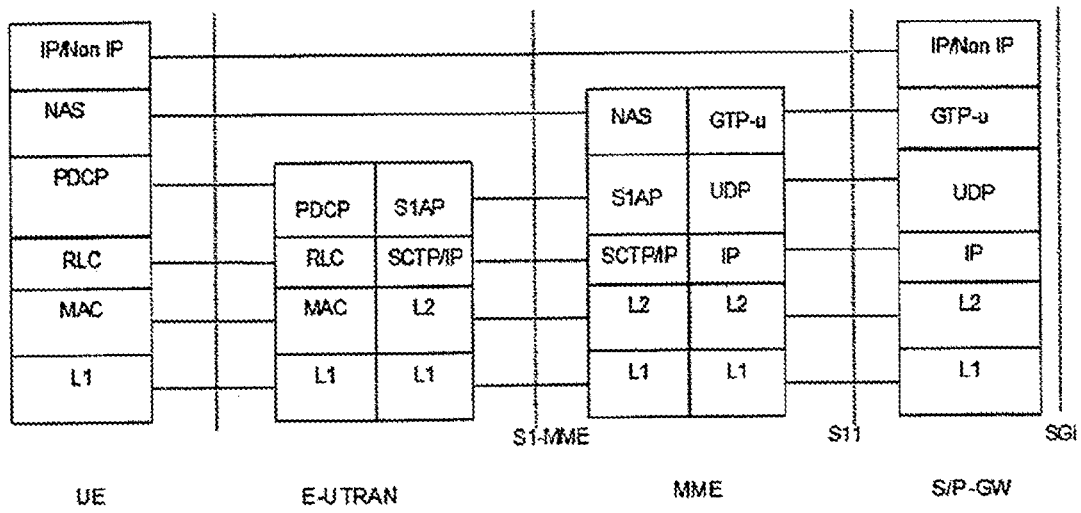
CP solution: protocol stack between UE and PGW
—Prior Art—
[Fig. 5]
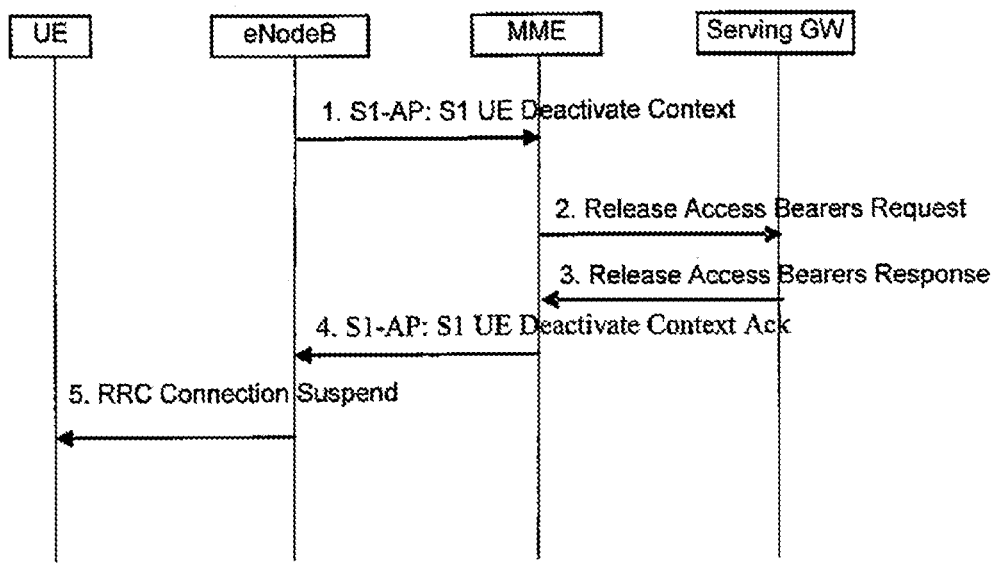
UP solution: eNodeB initiated Connection Suspend procedure
—Prior Art—

[Fig. 6]
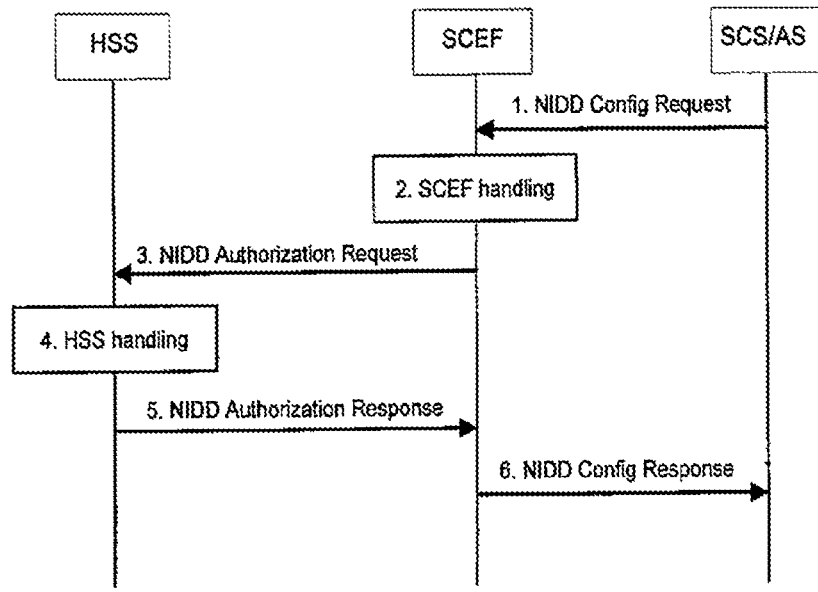
Configuration if SCEF for NIDD procedure
—Prior Art—
[Fig. 7]
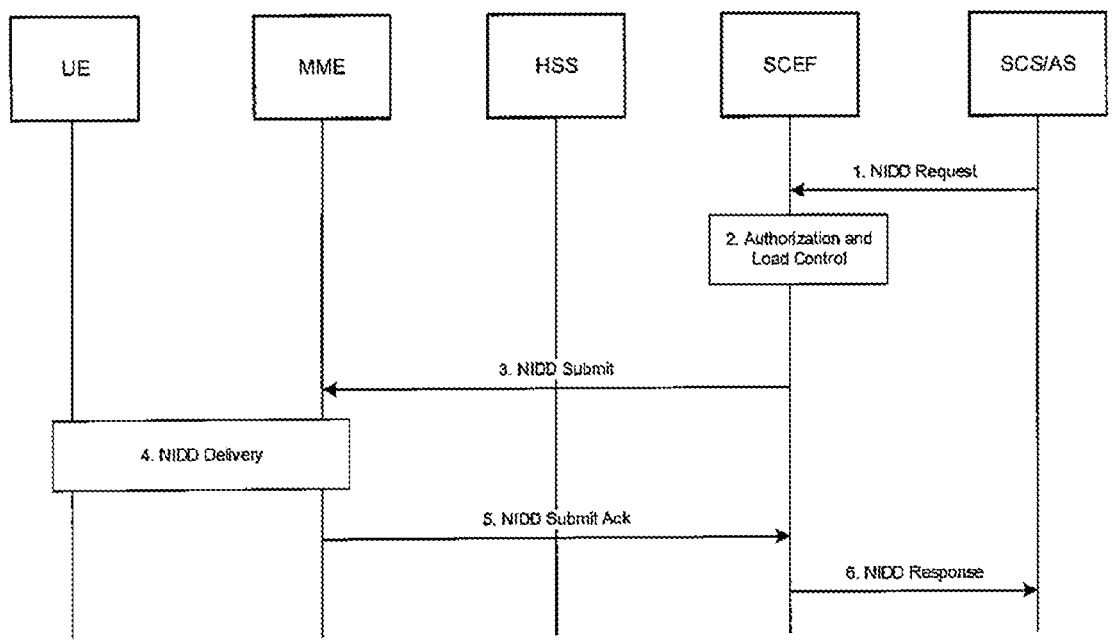
Mobile Terminated NIDD procedure
—Prior Art—

[Fig. 8]
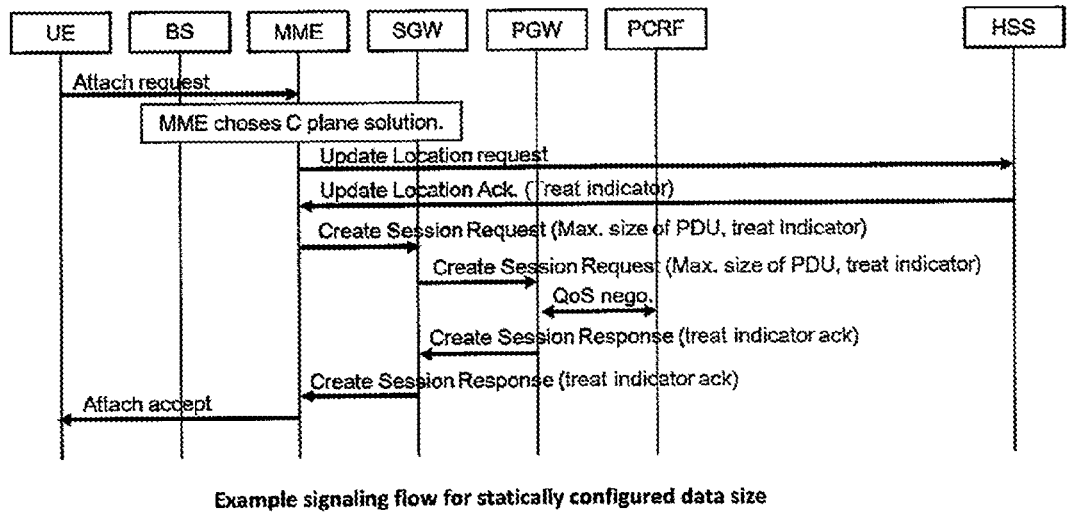
Example signaling flow for statically configured data size
[Fig. 9]
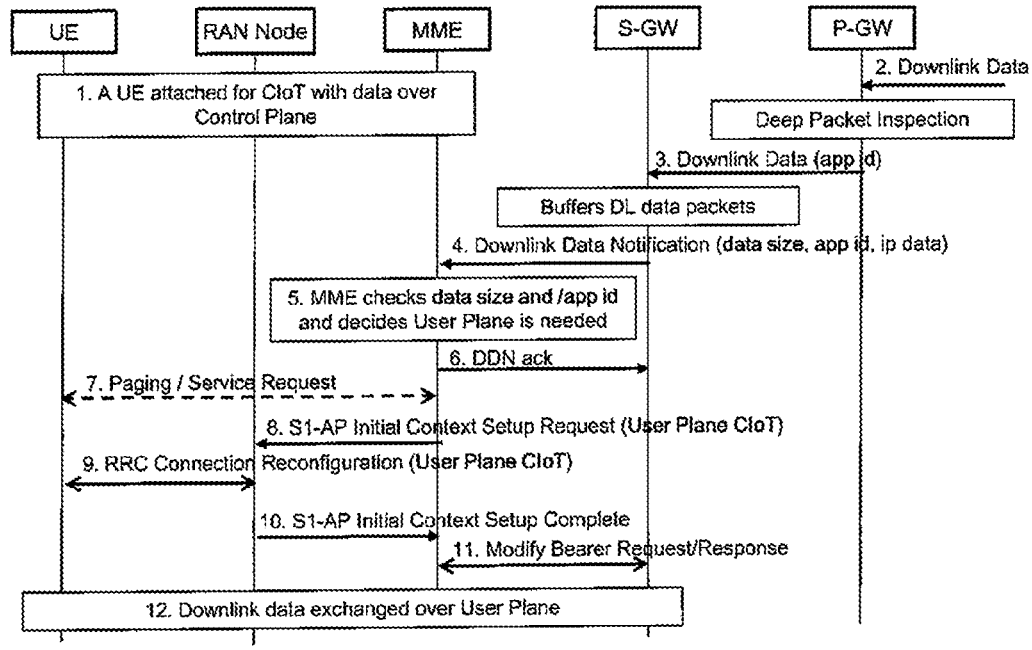
Control Plane CIoT to User Plane (CIoT or LTE) switch for large data via P-GW

[Fig. 10]
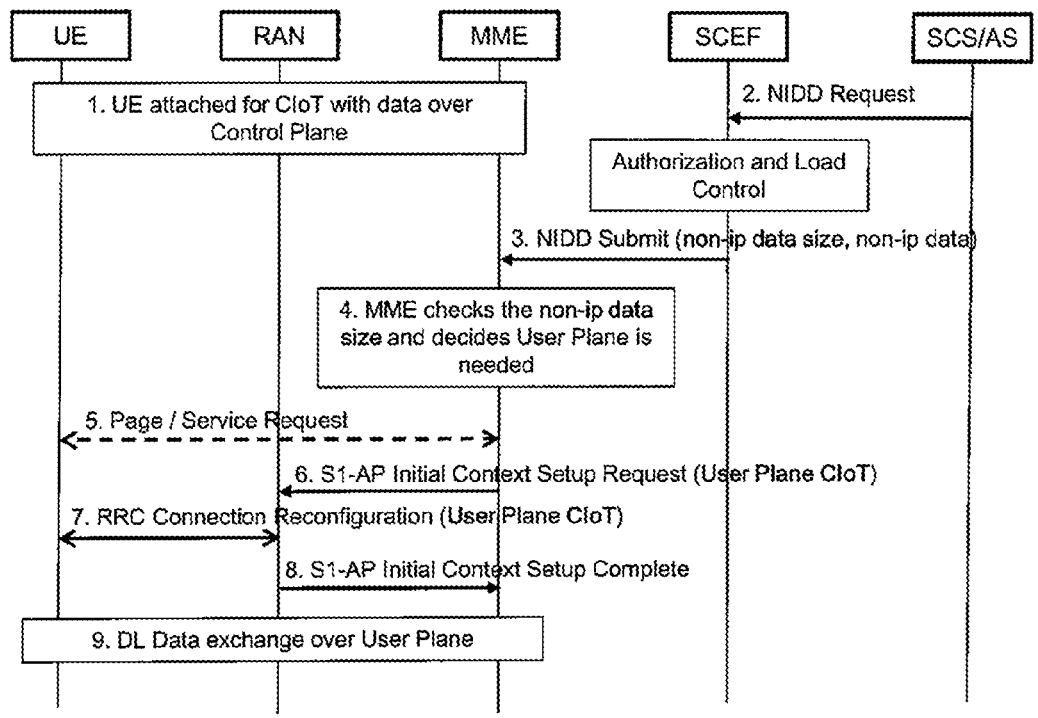
Control Plane CIoT to User Plane (CIoT or LTE) switch for large data via SCEF
[Fig. 11]
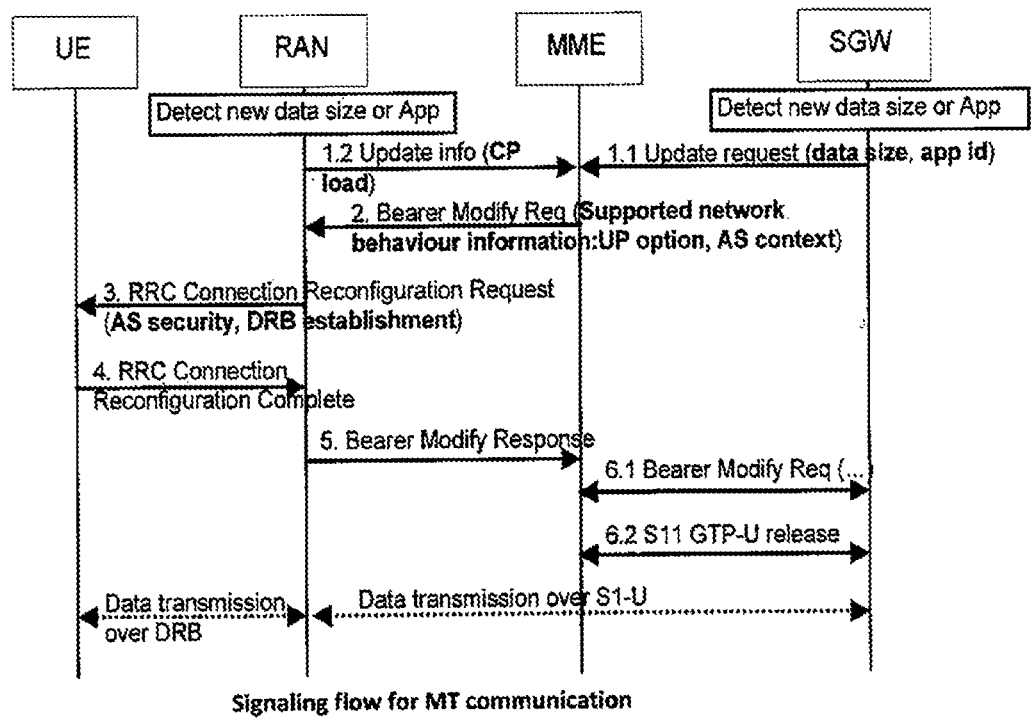
Signaling flow for MT communication

[Fig. 12]
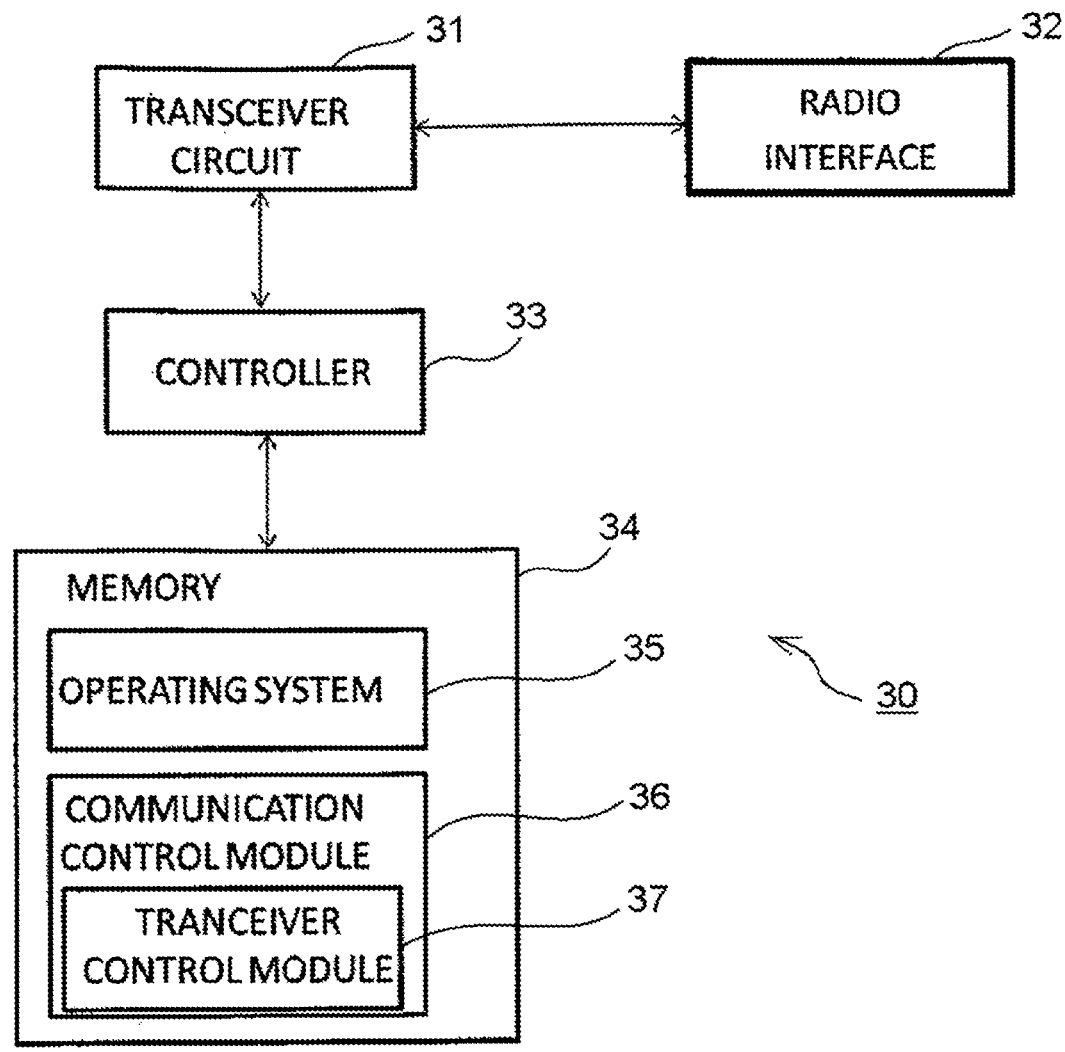
Block diagram for UE

[Fig. 13]
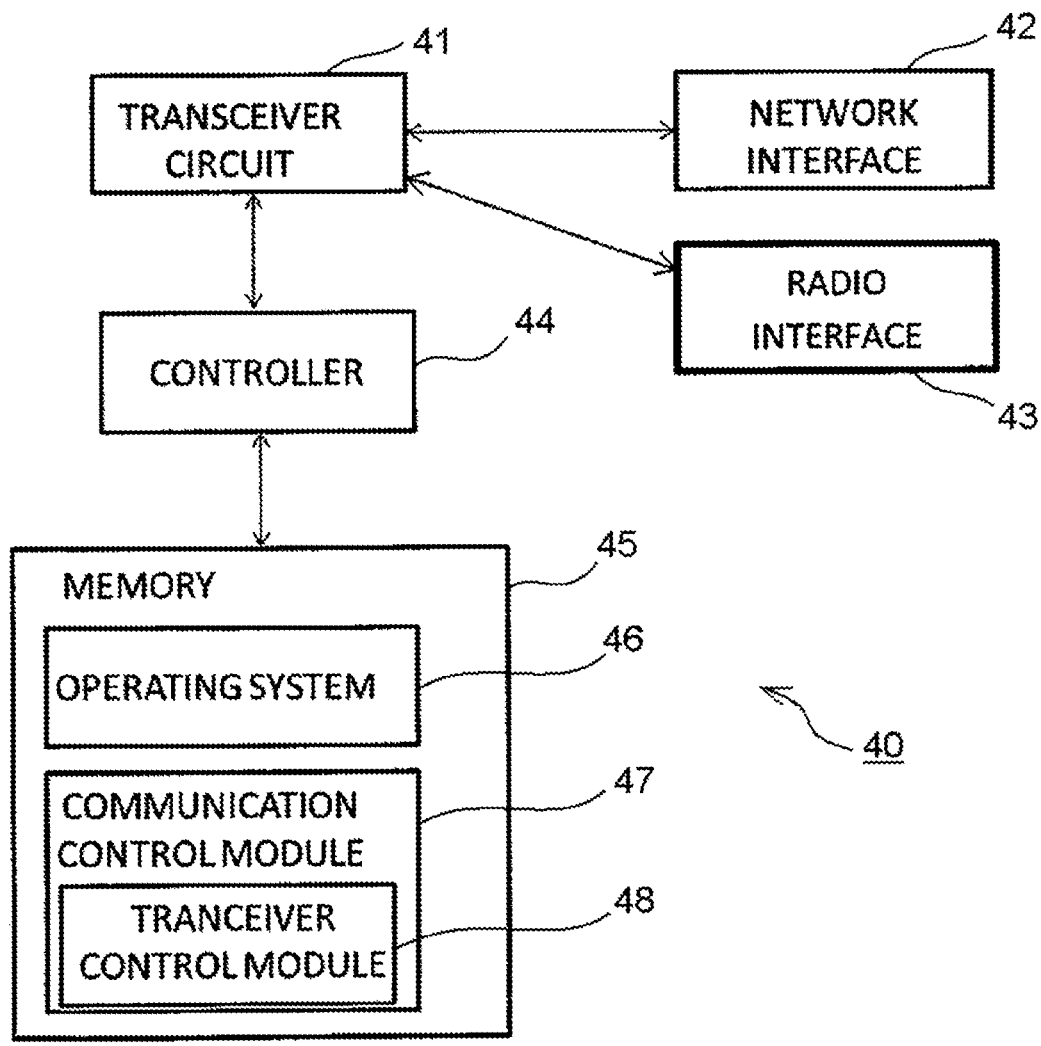
Block diagram for RAN node

[Fig. 14]
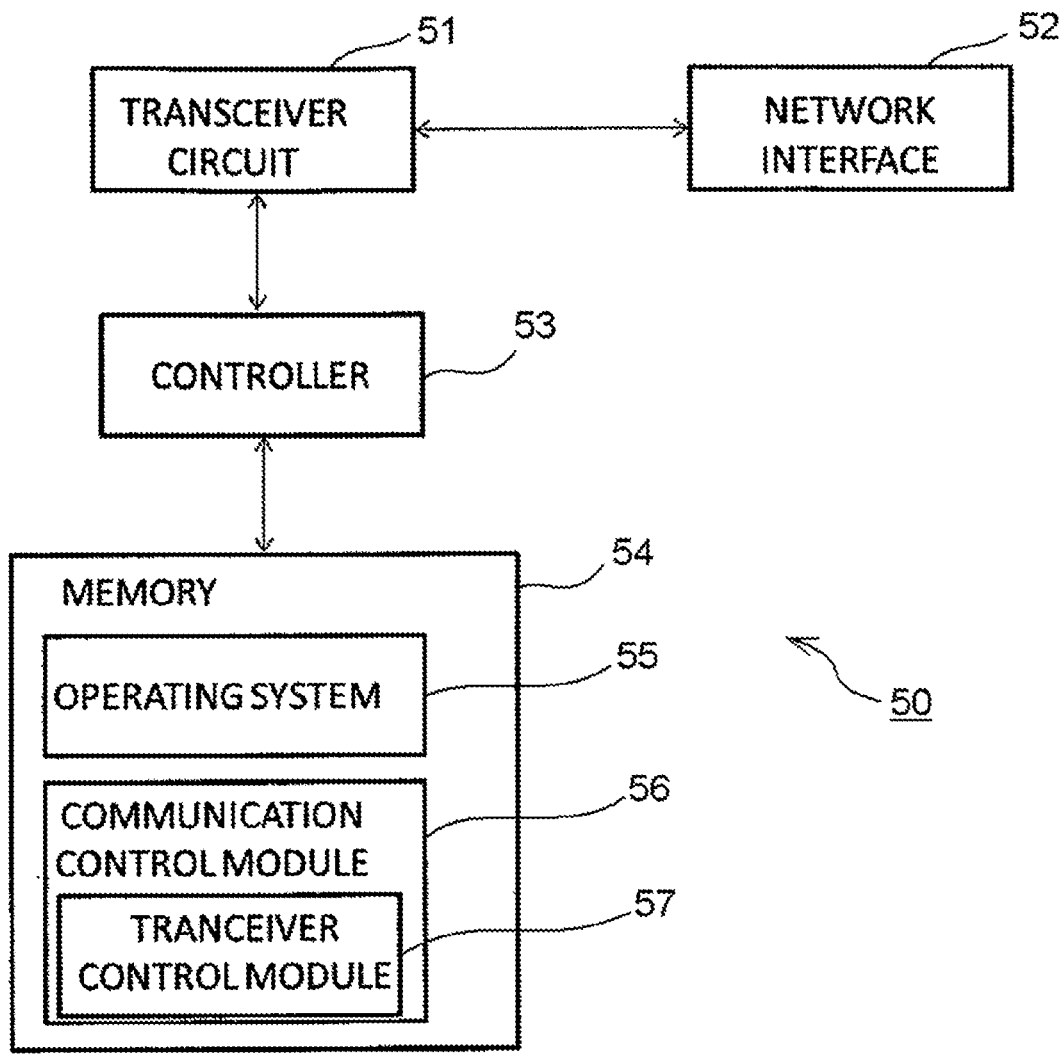
Block diagram for MME/SGSN, SGW, PGW, HSS, SCEF

METHOD FOR (RE)SELECTION OF CONTROL PLANE AND USER PLANE DATA TRANSMISSION

This Application is a continuation of U.S. patent application Ser. No. 16/810,384, filed Mar. 5, 2020, which is a continuation of U.S. patent application Ser. No. 15/755,927, filed Feb. 27, 2018, now U.S. Pat. No. 10,616,936, which is a National Stage Entry of International Application No. PCT/JP2017/004181, filed Feb. 6, 2017, which claims priority from European Patent Application No. 16275027.7, filed Feb. 17, 2016. The entire contents of the above-referenced applications re expressly incorporated herein by reference.

TECHNICAL FIELD

This invention relates to method for (re)selection of control plane and user plane data transmission.

BACKGROUND ART

The following abbreviations and terminology (whenever differently stated) are used in the current invention:

TABLE 1

| | |
|---|---|
| 3GPP | 3$^{rd}$ Generation Partnership Project |
| AS | Access Stratum (use similar to RRC signaling in this invention) |
| DCN | Dedicated Core Network |
| NB, eNB | Node B, evolved Node B (but can also be any 'RAN node' implementing 2G, 3G, 4G or future 5G technology) |
| E-UTRAN | Evolved Universal Terrestrial Radio Access Network (also used as EUTRAN) |
| GGSN | Gateway GPRS Support Node |
| GPRS | General Packet Radio Service |
| HPLMN | Home Public Land Mobile Network |
| HSS | Home Subscriber Server |
| IE | Informational Element (used as part of a signalling message) |
| MME | Mobility Management Entity |
| MNO | Mobile Network Operator |
| NAS | Non Access Stratum |
| NFV | Network Function Virtualization |
| NNSF | NAS/Network Node Selection Function |
| PCRF | Policy and Charging Rules Function |
| PGW | Packet Data Network Gateway |
| PSM | Power Saving Mode |
| RAU | Routing Area Update |
| RNC | Radio Network Controller |
| RRC | Radio Resource Control |
| PLMN | Public Land Mobile Network |
| SGSN | Serving GPRS Support Node |
| SGW | Serving Gateway |
| TAU | Tracking Area Update |
| UE | User Equipment |
| UTRAN | UMTS Terrestrial Radio Access Network |
| VPLMN | Visited Public Land Mobile Network |

The following terminologies are used within this invention.

The terms 'serving node' or 'MME/SGSN' or 'MSC/SGSN/MME' or C-SGN (CIoT Serving Gateway Node) is generally used through the various embodiments of this invention to describe a functional entity like MSC, or SGSN or MME, or C-SGN or other possible control plane functional entity in the mobile network which terminate the control plane signalling (known as NAS signalling) between the core network and the terminal. The serving node (MME/SGSN) can be also a functional entity from future generation networks which is responsible for mobility and session management.

The term HSS/HLR means the repository where the UE's subscription data is stored and can be either an HSS or an HLR or a combined entity.

The terms 'terminal', or 'device', or 'user terminal' or 'UE' (User Equipment) or 'MT' (Mobile Terminal) are used in an inter-exchangeable manner where all of the terms express the similarly the equipment used to send/receive data and signalling from network or mobile network or radio access network.

In the recent years due to the penetration of Internet of Things (IoT) and Machine-to-Machine (M2M) technologies the standard bodies like 3rd Generation Partnership Project (3GPP) start working on improvements known as Machine Type Communication (MTC) since Release 10. In order to even more reduce the price of end devices and the price in the operator's network for serving such devices, 3GPP carried out a work called Cellular IoT (CIoT). This work studied and evaluated the architecture enhancement to support ultra-low complexity, power constrained, and low data-rate IoT devices. The documentation of this study is captured in the document 3GPP TR23.720. The conclusions were 1) to specify a mandatory control plane (CP) solution, which is documented in section 2 in the TR and 2) to specify optionally user plane (UP) solution, which is documented in section 18 in the TR. Therefore the CP solution is also referenced as 'solution 2' and the UP solution is referenced as 'solution 18'.

The EPS optimized for CIoT supports traffic pattern that is different as compared to the normal UEs and may support only sub-set and necessary functionalities as compared with the existing EPS. An EPS optimized for CIoT can be enabled by having sub-set of functionalities implemented in single logical entity C-SGN (CIoT Serving Gateway Node). Mobility and Attach procedures are performed as described in other clauses for corresponding entities MME, S-GW and P-GW. An example single node non-roaming CIoT architecture is shown in FIG. 1. The detailed description of the reference points (interfaces) can be found in specification 3GPP TS23.401 and 3GPP TS23.682.

The selection between CP or UP solution happens during Attach procedure or during a TAU procedures. The UE indicates a 'Preferred Network Behaviour' including the following:

Whether Control Plane CIoT EPS optimisation is supported;
Whether User Plane CIoT EPS optimisation is supported;
Whether Control Plane CIoT EPS optimisation is preferred or whether User Plane Plane CIoT EPS optimisation is preferred;
Whether S1-U data transfer is supported;
Whether SMS transfer without Combined Attach is requested;
Whether Attach without PDN Connectivity is supported.

The serving node sends in the Attach or TAU accept message the 'Supported Network Behaviour' information.

In the CIoT EPS optimisations the UE can support "Attach without PDN connectivity", which mean that no PDN connectivity, and thus, no EPS bearers are established during the Attach procedure. The UE can request a PDN connectivity (IP or non-IP) at later point of time using NAS (E)SM signaling.

If the serving node configures the CP CIoT EPS optimization to be used, the data is transferred between UE and the serving node in NAS PDUs including the EPS bearer Identity of the PDN connection they relate to. Both the IP and non-IP data types are supported. This is accomplished by using the NAS transport capabilities of RRC and S1-AP protocols and the data transport of GTP-u tunnels between MME and S-GW and between S-GW and P-GW, or if a Non-IP connection is provided by via the MME with the SCEF, then data transfer occurs as indicated in TS 23.682 [74].

FIG. 2 shows a signaling flow of mobile originated (MO) data transmission for Control Plane CIoT EPS Optimisation (i.e. CP solution). This figure is according to TS23.401. When using CP solution for user data transport, the MME (for uplink, UL) and UE (for downlink, DL) uses the EPS Bearer Identity (EBI) contained within the NAS PDUs to identify the associated EPS bearer.

If the MME wishes to use the CP solution for mobile terminating (MT) services, then an example procedure is shown in FIG. 3 from TS23.401.

In order to depict the different protocols involved in the communication between UE and S/PGW, the protocol stacks over the various interfaces are shown in FIG. 4. Please note that this figure shows the protocol stacks for the CP CIoT Optimisations. One main change introduced by the CIoT EPS optimisations is the support of the GTP-U interface over the S11 interface, i.e. between MME and SGW.

In addition the mandatory agreed CP data transmission, it is also possible optionally to use UP data transmission, where the main feature is to the RRC Suspend procedure to store the UE's AS context in the eNB. This procedure is shown in FIG. 5, which is as per TS23.401 section 5.3.4A. Additionally in TS23.401 section 5.3.5A a Connection Resume procedure is described.

The CIoT EPS optimisations can also apply to LTE (EUTRAN) system. In particular, one intention is to cover wide-band (WB) EUTRN UEs (e.g. cat-M) with low cost properties. However, if a WB EUTRAN UE capable of NB-IoT uses NB-IoT solutions (CP or UP solution), there could be several restrictions when changing RATs. For example, if the UE has activated non-IP connection, then the UE may not reselect 2G/3G access and continue using the non-IP connection.

The non-IP Data Delivery (NIDD) via SCEF will be capture in 3GPP TS23.682, as currently the 3GPP Tdoc S2-160832 (which needs to be implemented in TS23.682) shows the procedures. NIDD may be used to handle mobile originated (MO) and mobile terminated (MT) communication with UEs, where the packets used for the communication are not based on the internet protocol (IP). The configuration of the SCEF for the delivery of the non-IP data is shown in FIG. 6 description and detailed description can be found in 3GPPTdoc S2-160832.

For example purposes, FIG. 7 shows the procedure using which the SCS/AS sends non-IP data to a given user as identified via External Identifier or MSISDN. This procedure assumes that procedures in establishment of EPS bearer for non-IP data and SCEF configuration procedure (as per FIG. 6) are completed.

CITATION LIST

Non Patent Literature

[NPL 1]
3GPP TS23.401, General Packet Radio Service (GPRS) enhancements for Evolved Universal Terrestrial Radio Access Network (E-UTRAN) access; Stage 2, v 13.5.0, 2015-12.
[NPL 2]
3GPP TR23.720, Architecture enhancements for Cellular Internet of Things; v 1.2.0, 2015-11.
[NPL 3]
3GPP TS23.203, Policy and charging control architecture; v 13.5.1, 2015-09.

SUMMARY OF INVENTION

Technical Problem

Problem Description

According to the background described above, the selection of the CP and UP solution can happen during Attach procedure or TAU procedure. This describes the selection of the transmission scheme, but there are no descriptions how the reselection can be achieved. A reselection of transmission mechanism can happen for example in case of changing data size because large data over CP transmission would be inefficient.

The dynamic switching between CP to UP transmission of data is not possible today. The dynamic selection between CP NB-IoT data transmission and WB-EUTRAN transmission in case of smartphone supporting CIoT EPS optimizations should be provided as well.

Assuming that reselection between CP and UP data transmission is performed using Attach procedure, then the problem is that Attach procedure require explicit signalling and authentication, which can increase (1) the signalling load in the RAN and CN and (2) the delay for switching between CP and UP. This may have impact on the user experience.

The aim of this invention is to provide solution(s) for dynamic switching between CP and UP transmission by minimizing (1) the signalling load in the RAN and CN and (2) switching delay. In addition, this invention describes a case where dynamic switching fails.

In case of a smartphone (capable of WB-EUTRAN and CIoT OPtimisations) is currently configured with WB-EUTRAN solution, it may be desirable in particular cases to use data transmission over CP (e.g. in case MT-SMS or MT-NIDD delivery). It is not clear today how to achieve it in an efficient way. Due to some (radio) restrictions, the MME or UE may decide to apply NB-IoT solution only.

Solution to Problem

In one aspect, the invention provides a core network node, comprising: means configured to transmit data using a Control Plane CIoT EPS Optimization; means configured to determine whether the data is transferred via User Plane or not, based on data size of the data; means configured to transmit a UE context setup request message to a radio access network node; means configured to receive a UE context setup complete message from the radio access network node when the radio access network node sets a radio bearer to a mobile terminal; and means configured to transmit a modify resources request message including a TEID(s) for accepted bearers to a Serving Gateway, S-GW, for PDN connection between the mobile terminal and PDN Gateway, P-GW.

In one aspect, the invention provides a controlling method for communication, comprising: transmitting data using a Control Plane CIoT EPS Optimization; determining whether the data is transferred via User Plane or not, based on data size of the data; transmitting a UE context setup request message to a radio access network node; receiving a UE context setup complete message from the radio access network node when the radio access network node sets a radio bearer to a mobile terminal; and transmitting a modify resources request message including a TEID(s) for accepted bearers to a Serving Gateway, S-GW, for PDN connection between the mobile terminal and PDN Gateway, P-GW.

In one aspect, the invention provides a radio access network node, comprising: means configured to receive a UE context setup request message includes a User Plane CIoT indication indicating User Plane CIoT EPS Optimization is supported or not from a core network node; means configured to set a radio bearer to a mobile terminal; and means configured to transmit a UE context setup complete message to the core network node.

In one aspect, the invention provides a communication method, comprising: receiving a UE context setup request message includes a User Plane CIoT indication indicating User Plane CIoT EPS Optimization is supported or not from a core network node; setting a radio bearer to a mobile terminal; and transmitting a UE context setup complete message to the core network node.

Advantageous Effects of Invention (1) Erroneous handling due to too large PDU size arrival to the EPC may be avoided or reduced (e.g. solutions 1 and solution 2).

(2) Overload in the limited NB-IoT control plane bandwidth (e.g. in RAN node) may be overcome or alleviated by switching from CP to UP transmission.

BRIEF DESCRIPTION OF DRAWINGS

FIG. 4 shows protocol stack between UE and PGW.

FIG. 5 shows eNodeB initiated Connection Suspend procedure.

FIG. 6 shows configuration if SCEF for NIDD procedure.

FIG. 7 shows the procedure using which the SCS/AS sends non-IP data to a given user as identified via External Identifier or MSISDN.

FIG. 8 shows example signaling flow for statically configured data size.

FIG. 9 shows CP CIoT to UP (CIoT or full LTE) switch when large DL data arrives and the UE is in idle mode and attached for Control Plane CIoT data transfer.

FIG. 10 shows Control Plane CIoT to User Plane (CIoT or full LTE) switch when large DL Non-IP data arrives and the UE is attached for Control Plane CIoT data transfer via SCEF.

FIG. 11 shows Signaling flow for MT communication.

FIG. 12 shows a block diagram for UE.

FIG. 13 shows a block diagram for RAN node.

FIG. 14 shows a block diagram for serving node.

DESCRIPTION OF EMBODIMENTS

Figure 1:
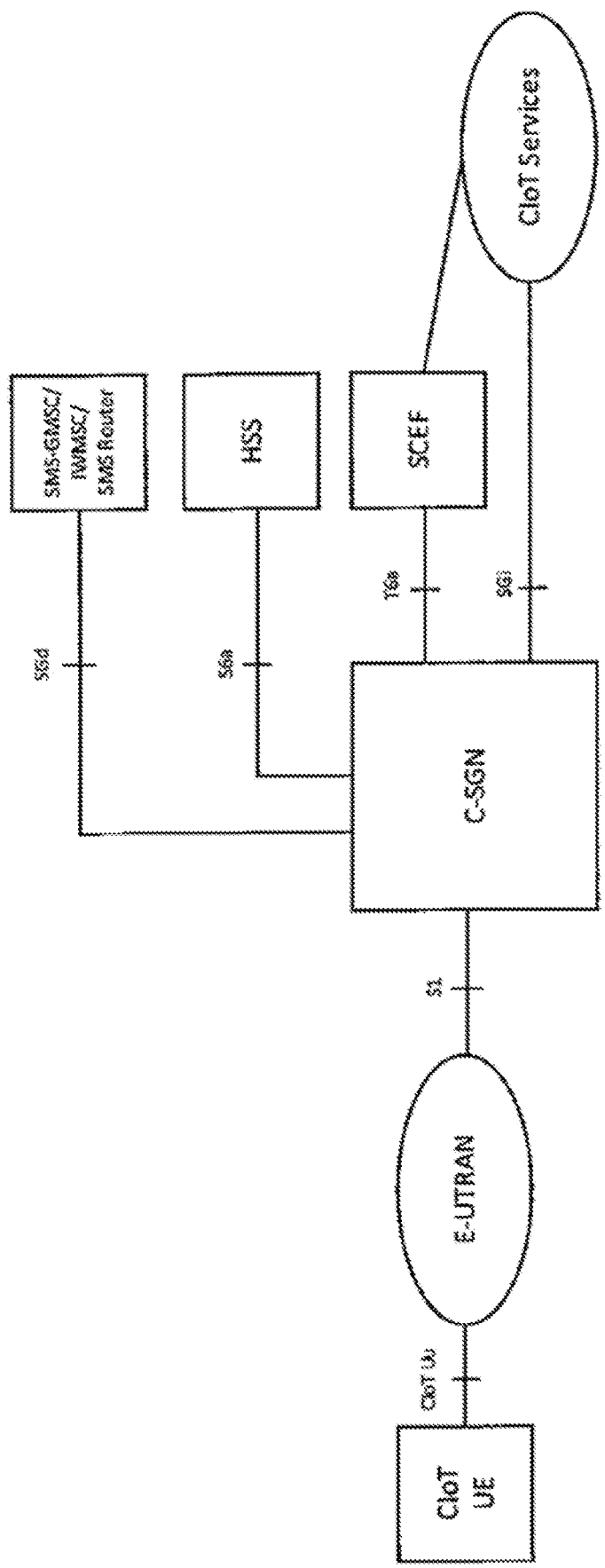
FIG. 1 shows an example single node non-roaming CIoT architecture.
Figure 2:
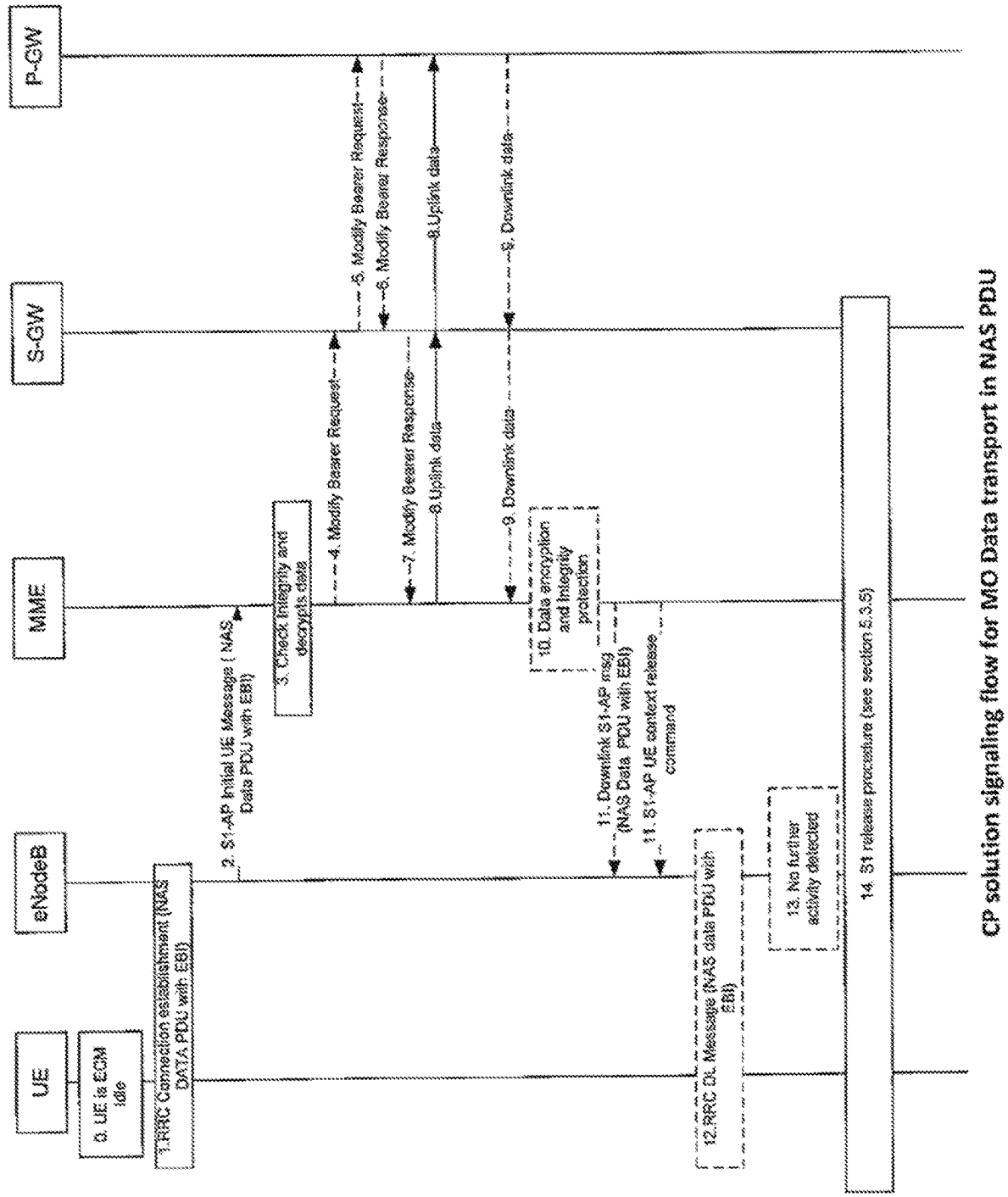
FIG. 2 shows a signaling flow of mobile originated (MO) data transmission for Control Plane CIoT EPS Optimisation (i.e. CP solution).
Figure 3:
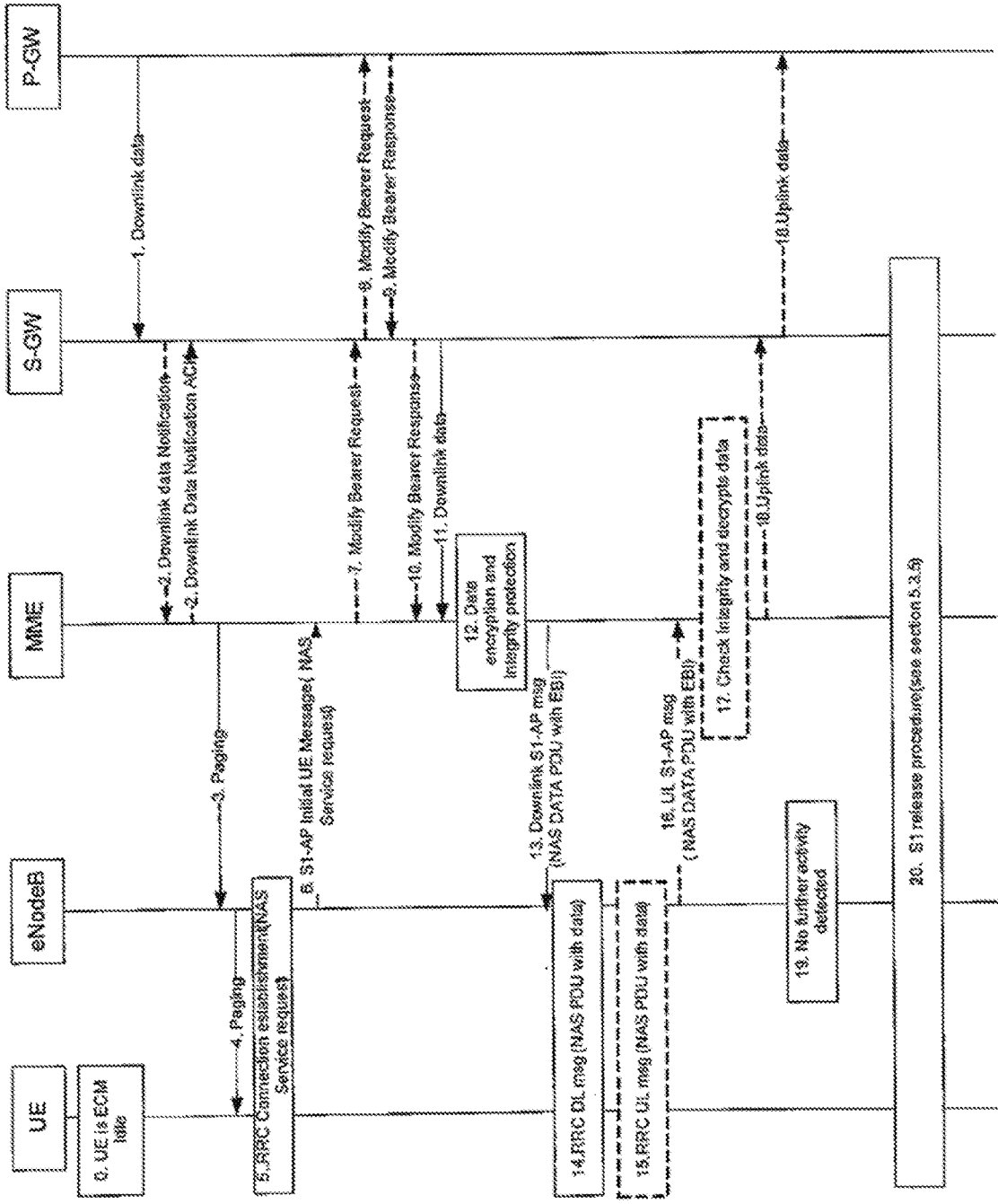
FIG. 3 shows signaling flow for MT Data transport in NAS PDUs.

In order to solve the above described problem, different solutions are described in various example embodiments herewith.

The idea of one solution in the present invention is to allow the MME to take decision about the efficient transmission scheme, i.e. over CP or over UP. The decision in MME may be based (1) on the size of the transmitted data (or on other data limitation criteria listed below) or (2) on the radio conditions experienced by the UE.

In one solution in this invention (solution 1), the MME informs PGW/SCEF and AS a maximum packet size that EPC or RAN can handle. This is based on statically configured maximum data size. Once C plane solution is chosen, the MME informs it to PGW/SCEF and AS.

FIG. 8 shows the signaling flow in case of solution 1.

New parameters:

The HSS has a subscription data "Treat indicator". This parameter indicates an NW behavior when large size of DL packet arrives to the EPC that exceeds more than maximum size of PDU that C plane solution can handle. Parameter should have a value that Discard, or Transfer data as much as possible.

The MME sends new parameter "Max. size of PDU" over the GTP-C message. This parameter is set based on the NAS capability how large data that NAS can handle PDU. For example, if multiple RRC handling is not supported, this value should be approximately 1500 bytes. Information of "Max. size of PDU" can be shown as max size of PDU itself or some bits to indicate "Max. size of PDU". For some bits to indicate "Max. size of PDU", MME/SGW/SCEF have a common table to show 0:1000 byte, 1:1500 byte etc.

The PGW sends new parameter "treat indicator ack". This parameter indicates that both "Max. size of PDU" and "Treat indicator" are comprehended by the PGW and indicates that whether indicated enforcement is possible or not.

The PGW handles DL PDU packet based on the instruction from the MME.

If a condition matches i,e. DL packet size exceeds a maximum size of PDU that C plane solution can handle, then enforce it based on an treat indicator. Example, simply discarded DL packet and report it to O&M system.

The benefit of solution 1 is that with this approach, unnecessary user traffic does come to the EPC.

Analogically the MME can inform an SCEF and/or AS in case that non-IP connection has been established. The SCEF sends new parameter "Max. size of PDU" to the AS. The AS sends new parameter "Treat indicator". This parameter indicates an NW behavior when large size of DL or UL packet is arrived to the EPC.

AS behavior: based on the "Max. size of PDU", the AS does not sends the PDU bigger than the size indicated.

Solution 1 provides the following benefit: erroneous handling due to too large PDU size arrival to the EPC can be avoided.

In summary, once a C plane solution is chosen, the MME informs it to PGW/SCEF and AS.

Alternatives:

At least one of following information can be exchanged instead of "Max. size of PDU".

a) total data volume which UE will receive b) max throughput or data rate (per certain period (e.g. second/hour/day/week)

c) max number of transmission (per certain period (e.g. second/hour/day/week))

d) a flag to indicate if total data volume which UE will receive exceeds/lowers a threshold.

Also, two or more parameters among a)-d) can be exchanged together as the alternative information.

If the apparatuses have implicit "Treat indicator" or if "Treat indicator" is exchanged in other messages, it's not mandatory for Create Session Request/Response to include "Treat indicator".

In another solution to the problem (referred as solution 2), the Dynamic reselection of (1) NB-IoT CP or UP solution or (2) NB-IoT solution and WB-EUTRAN solution based on different criteria in the network, preferably in the serving node. For example, one criterion can be due to large packet size or large amount of data (e.g. distributed in multiple data segments/packets).

In case large size of packets (IP and non-IP) needs to be handled when UE is either attached for CIoT over C-Plane or it has C-Plane solution activated, then UE/MME transform network configuration to User plane (UP) solution.

The decision for CP or UP selection may be also based on indication from the UE about the large data to be sent in the UL. The indication from UE to network can be for example:
  in MO case, the UE can indicate to the MME in e.g. Service Request procedure or other NAS or RRC signalling message; and
  in case that the UE is already in CONNECTED or ACTIVE state, and the UE determines that
  in MT case, MME sends AS context to eNB for DRB establishment during transition IDLE->CONNECTED For example the UE can indicate request for U-plane solution (or WB-EUTRAN) the above described cases.

In MO communication case, if the UE knows that large data is expected to be sent, then the UE may perform one of the following solutions:
  UE initiates the Detach procedure and re-attaches again. In the Attach request message, the UE indicates different preferences for CP and UP based on the expected large data. For example the UE can indicate UP solution preference in order to transmit the large data.
  In order to avoid the increased signaling during the Detach and Attach procedures, in alternative solution, the UE can initiate PDN connection release and re-establishment. During the PDN connection re-establishment, the UE can indicate to the serving node a) large data is expected, or b) preference for UP solution.
  has multiple PDN connections, then UE initiates the UE requested PDN disconnection procedure for the CIoT connection and then UE initiates the UE requested PDN connectivity procedure with U plane solution.

Another aspect of solution 2 is that the MME can decide whether to activate the UP solution based on the Application identifier (App Id), as some applications may generally send only small data, whereas other applications can generally send large amount of data. The application can be detected e.g. via deep packet inspection (DPI) at the network ingress point, e.g. TDF or PGW/PCEF. Later the PGW includes the App Id in the signaling towards SGW and MME, so that MME can decide whether to apply CP or UP transmission for the upcoming data.

In general, solution 2 addresses the use cases where large size of data needs to be handled (e.g. in downlink) when a UE is attached to the network and Control Plane solution for CIoT optimization (i.e transfer of data over Control Plane) has been configured. As the data transfer over the Control Plane is not efficient or even sometime not possible, it is proposed to dynamically switch from Control Plane CIoT optimization (i.e. transmission over Control Plane, CP) to User Plane CIoT optimization (i.e. transmission over User Plane, UP) or to full LTE user plane if the UE is LTE (i.e. WB-UTRAN) capable.

Solution 2.1—Control Plane CIoT to User Plane (CIoT or full LTE) switch for large non-IP or IP data delivery while the UE is attached and CIoT over Control Plane transmission has been configured. It is assumed that the large non-IP or IP data is transmitted over a PDN connection terminated at a P-GW.

FIG. 9 shows CP CIoT to UP (CIoT or full LTE) switch when large DL data arrives and the UE is in idle mode and attached for Control Plane CIoT data transfer.

The steps from FIG. 9 are described in detail as follows:
1. A CIoT capable UE (LTE UE with CIoT capability or CIoT only UE) is attached and Control Plane CIoT optimization has been configured for data transmission.
2. Downlink data arrives to P-GW functional entity. Alternatively if TDF is deployed, the DL data can be processed at the TDF, so this functional entity.
3. The P-GW (or TDF) may perform DPI (Deep Packet Inspection) to identify the origin of the data (e.g. originating application identified by 'app id'). The P-GW forwards the DL packet (s) to the S-GW. The 'app ID' can be included in the GTP-U header of the DL packet, or alternatively it can be included in the GTP-C protocol exchange between PGW and SGW.
4. The S-GW buffers the DL packet(s) and sends Downlink Data Notification to the MME including the received data size and the sender's app id, if available.
5. MME inspects the received DDN request for possible decision whether CP or UP transmission is to be applied. For this purpose the MME checks the data size to evaluate whether to continue the DL data delivery over the Control Plane or to switch to one of the available User Planes (Optimized CIoT User Plane or LTE User Plane) if the received downlink data is large and it is more efficient to send it over the User Plane. The MME may also consider the origin of the DL data (e.g. app id), if available, in deciding which delivery option, CP or UP, to use.
6. MME acknowledges the paging of the UE with DDN ack to the S-GW.
7. If UE in idle mode, the MME pages the UE which causes the UE to perform Service Request procedure.
8. If the MME decides to apply UP data transmission (based on the DL data evaluation at step 5), the MME sends S1-AP Initial Context Setup Request message to the RAN Node. This step activates the data radio bearer(s) (DRBs). The MME can include a 'User Plane CIoT' indication in the Initial Context Setup Request message to the RAN node in order to explicitly indicate the setup of UP CIoT use (in case of NB-IoT RAT).
9. The RAN Node (e.g. eNB) performs the radio bearer establishment with the RRC Connection Reconfiguration procedure. RAN Node may also indicate to the UE its preference for optimized CIoT User plane in the RRC Connection Reconfiguration Request message.
10. When the data radio bearer(s) are setup, the RAN Node sends the S1-AP message Initial Context Setup Complete to the MME.

Note: In case the Initial Context Setup procure fails or UE does not respond to the page to the paging procedure in step 7, then the MME sends the Downlink Data Notification Failure Indication message to the SGW. The Downlink Data Notification Failure Indication message shall include new cause value that indicates the reason of failure. For example, data size exceeded limit, switch from Control Plane to User Plane fails and etc.

11. The MME sends Modify Bearer Request message to the S-GW which contains the TEIDs for the accepted EPS bearers and P-GW confirms with Modify Bearer Response.

12. Now the User Plane (CIoT optimized or full LTE) is established and the DL data can be delivered to the UE over the establish User Plane.

Solution 2.2—Control Plane CIoT to User Plane CIoT switch for large Non-IP data delivery while the UE is in idle mode and CIoT optimizations over Control Plane has been configured.

FIG. 10 shows Control Plane CIoT to User Plane (CIoT or full LTE) switch when large DL Non-IP data arrives and the UE is attached for Control Plane CIoT data transfer via SCEF.

The steps from FIG. 10 are described in detail as follows:

1. A CIoT capable UE (LTE UE with CIoT capability or CIoT only UE) is attached for Control Plane CIoT optimization and is in idle mode.
2. Request for non-ip data delivery is received at the SCEF
3. The non-ip data request is authorized by the SCEF. The SCEF checks the size of the non-ip data and submits the non-ip data size and the non-ip data itself to the MME for delivery to an UE.

Note: It is possible that the non-ip data size is included in the NIDD Delivery Request from SCS/AS.

4. MME evaluates the non-ip data size whether it is within the limits for small data transmission over the Control Plane. If the received downlink data is large and it is more efficient to send it over the User Plane, the MME may decide to establish CIOT optimized User Plane or LTE User Plane, if supported by the UE.
5. If UE in idle mode, the MME pages the UE and the UE comes back with Service Request.
6. The MME sends S1-AP Initial Context Setup Request message to the RAN Node (e.g eNB). The MME includes an S1 user plane TEID that is assigned by the MME so that S1 user plane can be established between the eNB and the MME. This step activates the radio bearers and S1 bearers. If the MME decides to deliver the DL data over the optimized CIoT User Plane (based on the DL data evaluation at step 5), the MME include the 'User Plane CIoT' indication in order to indicate its preference (or request) for CIoT optimized User Plane type delivery.
7. The RAN Node performs the radio bearer establishment with the RRC Connection Reconfiguration procedure. RAN Node (e.g eNB) may also indicate its preference for optimized CIoT User plane to the UE in the RRC Connection Reconfiguration Request message.
8. When the user plane radio bearer(s) are setup, the RAN Node sends an S1-AP message Initial Context Setup Complete to the MME. The MME does not send the Modify Bearer Request message to the S-GW as the S1 user plane is established between the MME and the eNB. In case the Initial Context Setup procure fails or UE does not respond to the page to the paging procedure in step 5, then the MME sends the NIDD Delivery Failure Indication message to the SCEF. The NIDD Delivery Failure Indication message shall include new cause value that indicates the reason of failure. For example, data size exceeded limit, Dynamic switch from Control Plane to User Plane fails, Unable to page UE, Context not found, Unable to page UE due to Suspension, UE already re-attached, Temporarily rejected due to handover/TAU/RAU procedure in progress, UE not responding, Service denied, UE already re-attached and etc. If the SCEF receives the NIDD Delivery Failure Indication message from the MME, then the SCEF sends the NIDD Delivery Failure Indication message to the SCS/AS with new cause value in order for the SCS./AS to take an appropriate action to the Delivery Failure. New cause value can be for example, data size exceeded limit, Dynamic switch from Control Plane to User Plane fails, Unable to page UE, Context not found, Unable to page UE due to Suspension, UE already re-attached, Temporarily rejected due to handover/TAU/RAU procedure in progress, UE not responding, Service denied, UE already re-attached and etc.
9. Now the User Plane (CIoT optimized or full LTE) is established and the DL data can be delivered to the UE.

For the solutions 2.1 and 2.2, at least one of the following alternative information can be exchanged instead of data size (or non-ip data size):

a) max throughput or data rate (per certain period (e.g. second/hour/day/week)

b) max number of transmission (per certain period (e.g. second/hour/day/week))

c) a flag to indicate if total data volume which UE will receive exceeds/lowers a threshold.

Also, two or more parameters among a)-c) can be exchanged together as the alternative information.

The solutions 2.1 and 2.2 above assume that the UE is in IDLE state when DL data arrives at the MME. In addition, another solution 2.3 is described below which assumes that the UE is in CONNECTED mode when the DL data arrives at SGW or MME. Specifically, it is assumed that CP transmission has been configured and applied. The solution proposes to modify the radio interface configuration (i.e. radio bearers) and S1-U bearer during the UE is in CONNECTED mode.

The steps from FIG. 11 are described in detail as follows:

1. While the UE is in CONNECTED state, one of the user plane nodes (the either the RAN node or the PGW or the SGW) may detect that the data size or data amount is increasing above a threshold, or a new application has started data transmission. Upon such detection, the SGW/PGW or the RAN node inform the MME about the changed conditions over the user plane (i.e. increased data, new application, etc.). It is also possible that the MME detects itself the increased data or new application started without explicit indication from user plane functional entity.

For example in step 1.1, the SGW (which may have been informed by the PGW, not shown on the figure) informs the MME about new data/PDU size in the GTP-U header indicating Packet length parameter in the GTP-U header; or SGW uses GTP-C message to inform about new data amount or new application (e.g. app id).

Alternatively, in step 1.2, the RAN node can also detect the increased data transmission time over the SRB1/SRB2 or control plane (e.g. based on buffer size above certain threshold). This applicable preferably, but not limited to, limited control plane transmission bandwidth. For example many IoT UEs may receive data simultaneously and the RAN node transmission buffer may increase, thus leading to transmission delay. It's possible that eNB indicates such situation to MME, even the data PDU size is smaller than 1.5 Kbyte and was not detected by SGW/PGW as larger data. One example of such indication can be "CP load" meaning that CP transmission channels/bearers are overloaded for one particular or all UE served in a given cell or by given RAN node. Upon such detection the RAN node informs the MME about the changed data conditions.

2. After receiving the updated information from user plane (either RAN node or SGW/PGW) or detecting the changed situation by itself, the MME can determine whether the used CP transmission should be switched to UP transmission. If the MME determines that such switch from CP to UP transmission is needed, the MME initiates a procedure to change the UE's context in the RAN node, more specifically to initiate e.g. AS security setup and possible the DRB establishment. For example the S1-AP Bearer Modification procedure can be used, whereas new parameters may be included indicating to the RAN node the activation of DRB(s) and AS security.

3. Upon reception of the request from the MME, the Ran node (e.g. eNB) initiates the AS setup security setup, if not existing yet, and the establishment of DRB(s). For this purpose the eNB can use RRC Connection Reconfiguration procedure.

4. The UE confirms the RRC connection reconfiguration.

5. The RAN node (e.g. eNB) replies to MME about the successful radio connection modification. For example the eNB can send the Modify Bearer Response message.

6. The MME performs the reconfiguration of the SGW. For this purpose: In step 6.1, the MME reconfigures the SGW GTP-U forwarding by updating the SGW with the GTP-U TEID of the eNB, e.g. using the Bearer Modify Request procedure.

In step 6.2, the MME initiates the release of the existing GTP-U tunnel state over the S11 interface.

Optionally a new S11 procedure may be specified which performs a combined bearer modification procedure and the GTP-U release procedure.

As a result of the procedures performed as per FIG. 11, the UL and DL data is transmitted over the user plane (including either NB-IoT UP optimizations or WB-EUTRAN UP transmission).

With this solution 2.3, large PDU handling is possible while UE can usually stay in CONNECTED state. This results in reduces signaling compared to e.g. performing of Detach and re-attach procedure.

In additional example embodiment, it is proposed that the UE in CONNECTED mode indicates to the MME about bad radio conditions experienced by the UE. For example this can happen when the UE resides on the cell edge (i.e. bad radio conditions, e.g. the UE is in basement). In such case, in order to save battery power and still to assure reachability, it is proposed that the UE and network (MMS/SGSN) reselect the use of CP transmission from previously used UP transmission.

For this purpose, the UE can indicate via NAS signaling bad radio conditions to MME/SGSN. In another alternative, the RAN node can indicate the bad radio conditions to the MME/SGSN. The MME/SGSN initiates radio connection reconfiguration by switching from UP to CP transmission.

The alternatives of the solution 1 can be applied to the solution 2.

The description below applies to all solutions described in this invention.

According to the example embodiments in this invention, the mobile terminal (e.g. a UE) 30 is modified to be able to handle the signaling to/from the network (particularly from the RAN node). The mobile terminal 30 can be described schematically via the block diagram as in FIG. 12:

As shown in FIG. 12, the mobile terminal (UE) 30 comprises a transceiver circuit 31 and a radio interface 32 for transmitting signal to and for receiving signals from the network (the RAN node). The mobile terminal 30 comprises a controller 33 for control of the operation of the mobile terminal 30. The controller 33 is associated with a memory 34.

Software may be pre-installed in the memory 34 and/or may be downloaded via a communication network or from a removable data storage device (RMD), for example. The controller 33 is configured to control the overall operation of the mobile terminal 30 by, in this example, program instructions or software instructions stored in the memory 34. As shown, there software instructions include, among other things, an operating system 35 and a communication control module 36.

The communication control module 36 controls the communication between the mobile terminal 30 and the network. The communication control module 36 includes a transceiver control module 37.

According to the example embodiments in this invention, the RAN node (e.g. eNB, NB) 40 is modified to be able to handle the signaling to/from the network (to/from MME/SGSN) and to/from the UE 30. The RAN node 40 can be described schematically via the block diagram as in FIG. 13.

As shown in FIG. 13, the RAN node 40 comprises a transceiver circuit 41, a network interface 42 for transmitting signals to and for receiving signals from the serving node, and a radio interface 43 for transmitting signals to and for receiving signal from the mobile terminal 30. The RAN node 40 comprises a controller 44 to control the operation of the RAN node 40. The controller 44 is associated with a memory 45.

Software may be pre-installed in the memory 45 and/or may be downloaded via a communication network or from a removable data storage device (RMD), for example. The controller 44 is configured to control the overall operation of the RAN node 40 by, in this example, program instructions or software instructions stored in the memory 45. As shown, there software instructions include, among other things, an operating system 46 and a communication control module 47.

The communication control module 47 controls the communication between the RAN node 40 and the mobile terminal 30 and the communication between the RAN node 40 and the serving node. The communication control module 47 includes a transceiver control module 48.

According to the example embodiments in this invention, the serving node (MME/SGSN/MSC/C-SGN) 50 should be modified/extended to be able to behave according to the proposed solution(s). Further, modifications to SGW, PGW and HSS are needed. For this purpose the serving node (MME/SGSN) 50, SGW, PGW, SCEF or HSS can be described schematically via the block diagram as in FIG. 14:

As shown in FIG. 14, the serving node 50 comprises a transceiver circuit 51 and a network interface 52 for transmitting signal to and for receiving signals from other network entities (the RAN node 40). The serving node 50 comprises a controller 53 for control of the operation of the serving node 50. The controller 53 is associated with a memory 54.

Software may be pre-installed in the memory 54 and/or may be downloaded via a communication network or from a removable data storage device (RMD), for example. The controller 53 is configured to control the overall operation of the serving node 50 by, in this example, program instructions or software instructions stored in the memory 54. As shown, there software instructions include, among other things, an operating system 55 and a communication control module 56.

The communication control module 56 controls the communication between the serving node 50 and the other network entities (the RAN node 40). The communication control module 56 includes a transceiver control module 57.

While the invention has been particularly shown and described with reference to example embodiments thereof, the invention is not limited these embodiments. It will be understood by those skill in the art that various changes in form and details may be made therein without departing from the sprit and scope of the present invention as defined by the claims.

This application is based upon and claims the benefit of priority from European Patent application No. EP16275027.7, filed on Feb. 17, 2016, the disclosure of which is incorporated herein in its entirety by reference.

The invention claimed is:

1. A user equipment (UE), comprising:
   a memory storing instructions; and
   at least one processor configured to process the instructions to:
   send, to a mobility management node, preferred network behavior information indicating whether Control Plane (CP) Cellular Internet of Things (CIoT) Optimization is supported, and indicating whether User Plane (UP) CIoT Optimization is supported,
   receive, from the mobility management node, supported network behavior information,
   when the CP CIoT Optimization is enabled based on the preferred network behavior information and the supported network behavior information; determine Uplink (UL) data transfer via the UP based on an amount of data to be transferred in the UL, and
   initiate a Service Request procedure to establish the UP by sending a Non Access Stratum (NAS) message to the mobility management node.

2. A controlling method for a user equipment (UE), the controlling method comprising:
   sending, to a mobility management node, preferred network behavior information indicating whether Control Plane (CP) Cellular Internet of Things (CIoT) Optimization is supported and indicating whether User Plane (UP) CIoT Optimization is supported;
   receiving, from the mobility management node, supported behavior information;
   when the CP CIoT Optimization is enabled based on the preferred network behavior information and the supported network behavior information; determining Uplink (UL) data transfer via the UP based on an amount of data to be transferred in the UL; and
   initiating a Service Request procedure to establish the UP by sending a Non Access Stratum (NAS) message to the mobility management node.

* * * * *